No. 714,440. Patented Nov. 25, 1902.
W. J. BOLLAND.
ICE CREAM DISHER.
(Application filed Aug. 29, 1902.)
(No Model.)
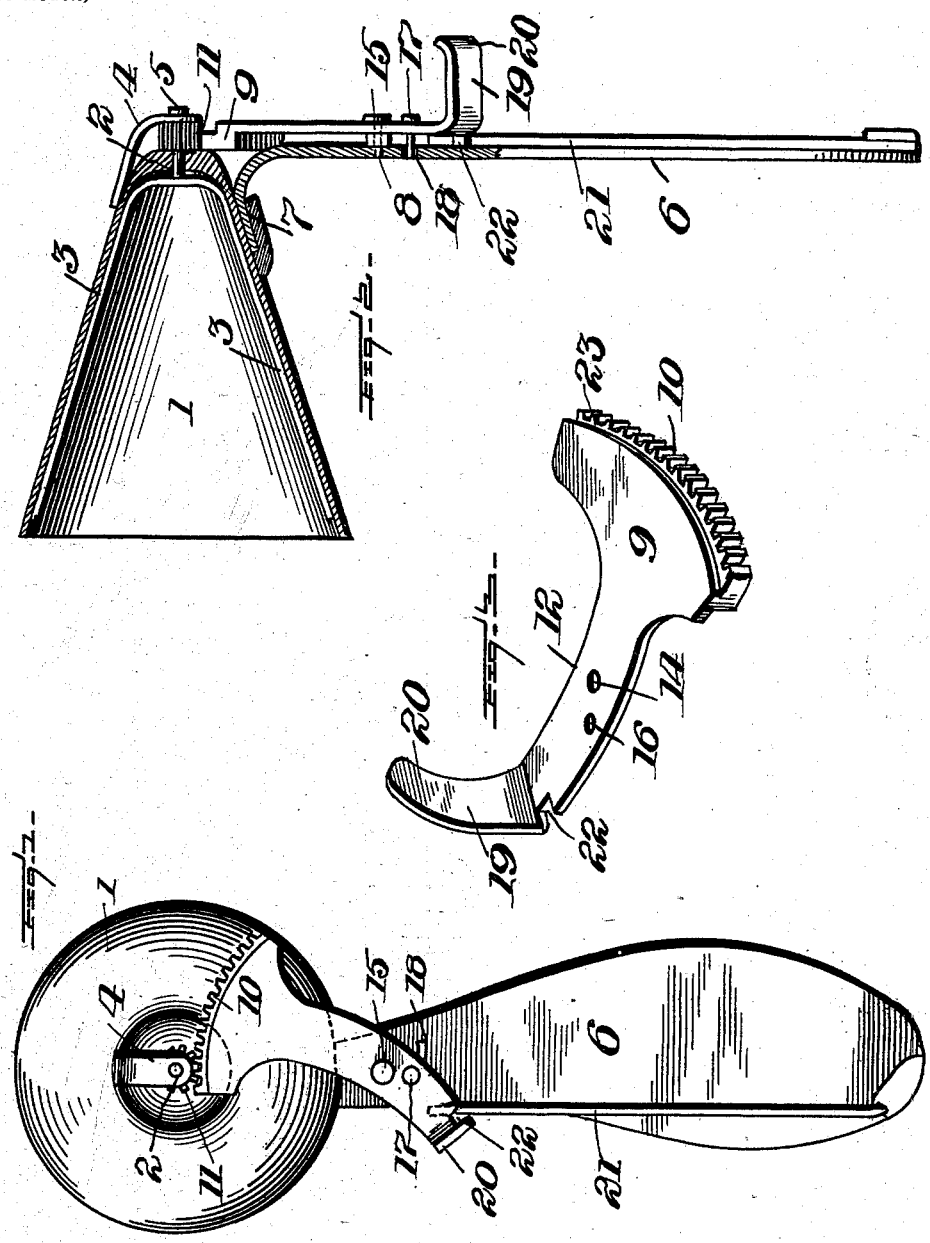
Witnesses
Inventor
W<sup>m</sup> John Bolland

UNITED STATES PATENT OFFICE.

WILLIAM J. BOLLAND, OF PITTSBURG, PENNSYLVANIA.

ICE-CREAM DISHER.

SPECIFICATION forming part of Letters Patent No. 714,440, dated November 25, 1902.

Application filed August 29, 1902. Serial No. 121,492. (No model.)

*To all whom it may concern:*

Be it known that I, WILLIAM J. BOLLAND, a citizen of the United States of America, residing at Pittsburg, in the county of Allegheny and State of Pennsylvania, have invented certain new and useful Improvements in Ice-Cream Dishers, of which the following is a specification, reference being had therein to the accompanying drawings.

This invention relates to certain new and useful improvements in ice-cream dishers, the primary object of the invention being to construct a disher of this type which may be conveniently and effectively operated with one hand to complete the operation of dipping the cream from the can and discharging the same from the disher onto a plate or other receptacle.

Briefly described, my invention comprises a cone-shaped mold with the cutters mounted therein and connected to a shaft extending through the apex of the cone and having a pinion mounted thereon to be engaged by the segment that is pivotally mounted on the handle of the disher, all of which construction will be hereinafter described in detail, and specifically pointed out in the claim.

In describing the invention in detail reference will be had to the accompanying drawings, forming a part of this specification, and wherein like numerals of reference will be employed to indicate like parts throughout the several views of the drawings, in which—

Figure 1 is a top plan view of my improved mold. Fig. 2 is a central longitudinal sectional view of the same. Fig. 3 is a detail perspective view, detached, of the operating-segment and handle.

To put my invention into practice, I provide a mold 1, preferably made conical in form, as in the usual construction. In the apex of this mold is journaled a shaft 2, to which is connected the cutters 3, which operate on the inner face of the mold to cut the frozen cream away from the mold and permit the same to drop out onto a plate or other receptacle. Since by the aid of my operating means I am enabled to give each of the cutters a sweep covering over one-half of the inner circumference of the mold, I need employ but two of the cutters, and they may therefore be made from a single strip of material, which can be bent to form the two cutters and be mounted centrally of its length on the shaft 2. The shaft is supported in a bracket 4, attached to the outer face of the mold and receiving the upper end of said shaft, which is preferably riveted or flattened at its upper end, as at 5. A handle 6 is attached to the mold 1, which may be conveniently accomplished by soldering an ear 7 to the mold, this ear clamping the end of the handle therein and firmly securing the same. The handle is provided on its upper face with a ridge 8, on which is pivotally mounted the operating mechanism. This mechanism consists of a segment 9, the rack 10 of which meshes with the pinion 11, mounted on the shaft 2 between the upper end of the mold and the bracket 4. This segment carries an extension 12, provided with an aperture 14, to receive the pivot-pin 15, which secures the same to the ridge 8. The extension 12 is also provided with an opening 16, through which is passed a stud or pin 17, which operates in a curved slot 18, provided therefor in the handle 6, and limits the movement of the segment in each operation thereof. At its outer end the extension 12 is turned upwardly to form a handle or thumb-piece 19, provided with a curved edge 20, so as to form a neat fit with the ball of the thumb. A spring 21 serves to return the segment to its normal position after each operation thereof, the outer end of this spring being suitably secured to the handle 6 and the inner end thereof resting against lug 22, which is formed by notching the extension 12 at its outer end and bending the notched portion down to form the lug. The handle 6 is preferably swelled along the one edge, so as to form a convenient fit with the hand, and in operation it will be observed that when pressure is pushed against the thumb-piece 19 and the same forced across the handle 6 the movement imparted to the segment 9 will impart rotary movement to the cutters to cause the same to perform their function. When the pressure on the thumb-piece 19 is relieved, the spring 21 returns the cutters to their normal position. It will be observed that the segment rests lightly on the apex of the cone, and consequently this operating mechanism is supported both at the rack and at its pivotal point. The length of the teeth 10 may be made considerably less than the teeth on the pinion 11, which is easily accomplished by shearing, as shown at 23 in Fig. 3. This construction materially decreases the friction between the teeth 10 and the pinion, while at the same time it insures a positive engagement of said teeth.

In the practice of the invention it will be noted that various slight changes may be made in the details of the construction without departing from the general spirit of my invention.

Having fully described my invention, what I claim as new, and desire to secure by Letters Patent, is—

In an ice-cream disher the combination of a mold, a bracket carried thereby, a shaft journaled in the apex of the mold and in the bracket, a pinion mounted on said shaft between the bracket and the apex of the mold, a handle secured to the mold and provided with a curved slot, a segment pivotally mounted on said handle and provided with a thumb-piece, a pin carried by said segment to travel in the curved slot in the handle and limit the movement of the segment at each operation, and a spring having its one end secured to the handle and at its other end engaging the segment to return the same to its normal position after each operation, substantially as described.

In testimony whereof I affix my signature in the presence of two witnesses.

WILLIAM J. BOLLAND.

Witnesses:
JOHN NOLAND,
A. M. WILSON.